United States Patent [19]
Dow et al.

[11] 3,735,503
[45] May 29, 1973

[54] PROGRAMMED INSTRUCTIONAL SYSTEM

[75] Inventors: Bruce R. Dow, Altamonte Springs, Fla.; Francis T. Thompson, Murrysville, Pa.

[73] Assignee: Westinghouse Electric Corporation, Pittsburgh, Pa.

[22] Filed: July 30, 1971

[21] Appl. No.: 167,581

[52] U.S. Cl. ................................................. 35/9 A
[51] Int. Cl. .............................................. G09b 7/04
[58] Field of Search ......................................... 35/9 A

[56] References Cited

UNITED STATES PATENTS

| | | | |
|---|---|---|---|
| 3,484,950 | 12/1969 | Serrell et al. | 35/9 A |
| 3,537,190 | 11/1970 | Serrell et al. | 35/9 A |
| 3,408,749 | 11/1968 | Brudner | 35/9 A |
| 3,623,238 | 11/1971 | La Plume et al. | 35/9 A |
| 3,407,513 | 10/1968 | Conn | 35/9 A |

Primary Examiner—Wm. H. Grieb
Attorney—F. H. Henson et al.

[57] ABSTRACT

In an instructional system including a multi-channel recording/reproducing medium having stored thereon recorded material in the form of instructions, lectures, questions, remedial material, reinforcing material, channel transfer codes, etc. and including listener operated response switches for entering responses following reproduction of a lecture and question.

The listener response occurs at a branching point in the multichannel recording medium. The entering of a response by actuating listener selected switches results in the reproduction of material on a specific channel and in a predetermined direction. Each of the numerous possible listener responses results in the reproduction of material tailored specifically for that one response. The presence of recorded code signals following the segments of material reproduced following a listener's response serves as a transfer signal to assure reproduction of all the material on the various channels and in the proper direction necessary to complete the material appropriate to the response. The completion of the reproduction of this material reestablishes the system at the branching point.

7 Claims, 9 Drawing Figures

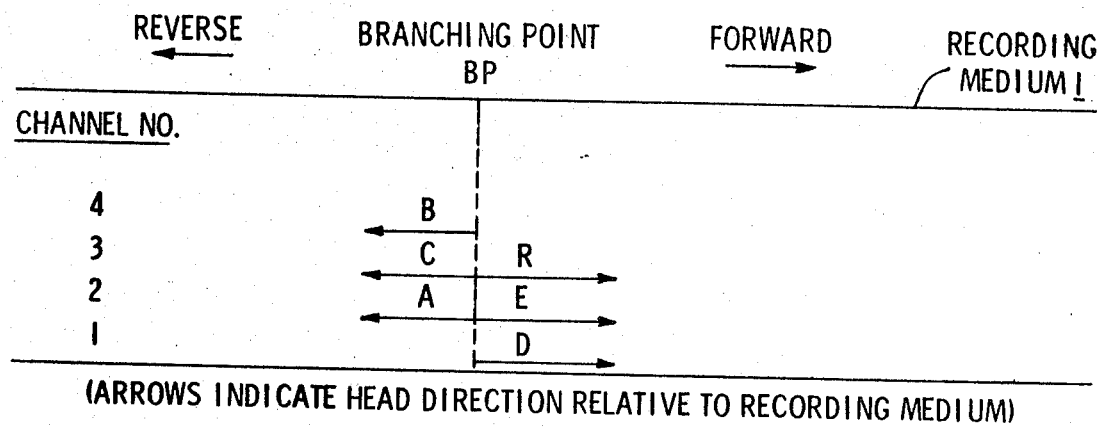
FIG. 1
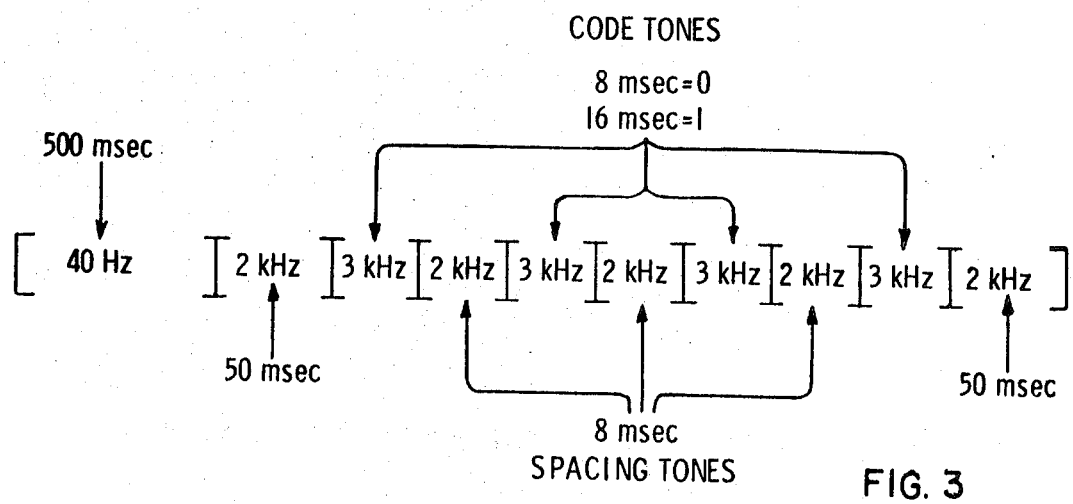
FIG. 3
| ANSWER SWITCH | CHANNEL | DIRECTION | CODE | | |
|---|---|---|---|---|---|
| | | | ADD 1 | ADD 2 | DIR |
| D | 1 | FORWARD | 0 | 0 | 1 |
| | 1 | REVERSE | 0 | 0 | 0 |
| E | 2 | FORWARD | 1 | 0 | 1 |
| A | 2 | REVERSE | 1 | 0 | 0 |
| R | 3 | FORWARD | 1 | 1 | 1 |
| C | 3 | REVERSE | 1 | 1 | 0 |
| | 4 | FORWARD | 0 | 1 | 1 |
| B | 4 | REVERSE | 0 | 1 | 0 |
FIG. 4

PROGRAMMED INSTRUCTIONAL SYSTEM

BACKGROUND OF THE INVENTION

While several prior art instructional systems have provided preset recorded response to a listener's response to a set of instructions and a question, these systems fail to provide operational flexibility at reasonable cost.

In the U.S. Pat. No. 3,194,895 issued to R. J. Treadwell a YES-NO type of instructional system is disclosed which provides reproduction of remedial material in response to a NO response by a listener. The remedial material was limited in length by the length of the recorded instructions. Furthermore, the Treadwell system required replay of a portion of the original instructions to return the system to the point where the listener entered his response.

Other systems recite the use of complex, expensive electronics to interrogate a listener's response and in turn locate the appropriate material for reproduction. Typical instructional systems are disclosed in U.S. Pat. Nos. 3,408,749 and 3,504,447 issued to H. J. Brudner.

SUMMARY OF THE INVENTION

Effective teaching using an automated instructional device requires that the material presented to the student be related to his understanding of previously presented material. Accordingly, in the present invention, the student is given an instructional lecture followed by a question which requires the student to select a response from a number of choices. The material subsequently presented to the student is determined by the choice that he selects. The question can be of several types.

For example, if the student is asked to select the correct answer from a number of answer choices; A, B, C, D, or E and he selects the correct answer, a reinforcing response is reproduced telling him that he has answered correctly and a subsequent lecture is reproduced. If he selects an incorrect answer, e.g. answer A, a supplemental remedial lecture corresponding to this incorrect answer is reproduced. The selection of a different incorrect answer, e.g. answer C, a different supplemental remedial lecture is reproduced which explains why answer C is incorrect and re-explains the material leading up to the question.

Another use of the apparatus described in the invention relates to answering a questionnaire, such as that pertaining to a patient's medical history. For example, a positive response to a given question could lead to material containing more detailed questions in a given area, while a negative answer might result in skipping over these detailed questions.

It is accordingly the object of this invention to provide an improved instructional or question-taking device which is capable of providing a choice of one of several sets of prerecorded material in response to a manually entered response. It is a further object to minimize the complexity and cost of the equipment required to select a given prerecorded channel. It is a further object to minimize constraints governing the interrelationships between the sets of prerecorded material and their order of reproduction.

Although the invention is described relative to a 4 channel tape, other numbers of channels may be used without deviating from the scope of the invention. The use of a turn-over cartridge with only a portion of the tracks used per side could be beneficial, since rewinding at the end of the presentation would be unnecessary. The invention may be equally applied to other recording mediums such as motion picture film.

DESCRIPTION OF THE DRAWINGS

FIG. 1 illustrates schematically a four channel recording medium;

FIG. 3 is a representation of an audio tone code pattern of the type recorded on the recording medium of FIG. 2;

FIG. 4 is a tabulation of code and recording channel assignments;

DESCRIPTION OF THE PREFERRED EMBODIMENT

A four channel recording medium is illustrated in FIG. 1. The medium which is used for recording audio information typically in the 40 Hz to 5,000 Hz range may be implemented through the use of a tape cassette cartridge. Typically, a lecture would be given followed by a question. The tape is stopped at the completion of the question at a location which is defined as the branching point BP. The tape remains stationary until one of the response switches A, B, C, D, E or R (repeat), is manually operated. In accordance with the invention, a particular channel and direction from the branching point is permanently assigned to each response switch. For example, as illustrated in FIG. 1, switch A selects channel 2 in the reverse direction, while switch B selects channel 4 in the reverse direction. Similarly, switch C selects channel 3 in the reverse direction, switch D selects channel 1 in the forward direction and switch E selects channel 2 in the forward direction. Depressing the repeat switch R selects channel 3 in the forward direction. When a switch is depressed, the tape drive is activated by a GO signal in the direction assigned to the selected switch. The sound recorded on the selected channel is reproduced. In addition to the aural lecture or question material contained on each channel, each channel contains a number of code signals. These signals consist of audio tones as explained in a cofiled copending application Ser. No. 167,582, entitled Audio Waveform for Digital Recording and assigned to the assignee of the present invention. Although the switch selected will determine the initial channel and tape direction when leaving a branch point, the code signals recorded on a channel permit the selection of a new channel and/or a new direction. A three-bit code suffices for the selection of one of the four channels and the selection of forward or reverse. In addition, a code signal may be recorded for the purpose of stopping the tape drive at a branching point. A different type of code such as an extra-long burst of one of the high frequency audio tones may be used for the stop code. Alternately, as described in more detail in the given embodiment, a code signal corresponding to the channel and direction presently in use can be used as a stop code.

Figure 2:
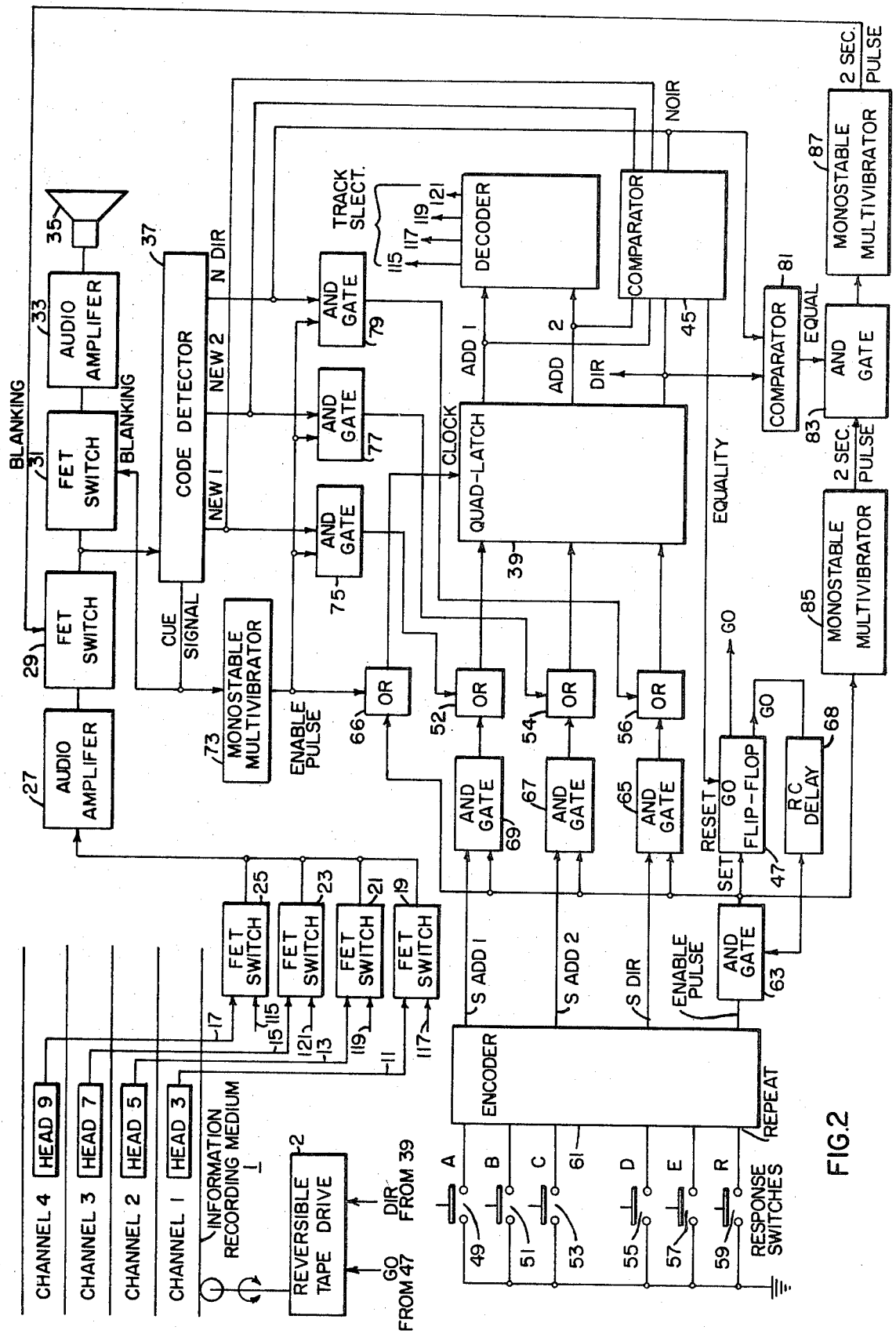
FIG. 2 is a block diagram schematic of a multichannel instructional system.

Referring to FIG. 2, which shows a block diagram of a preferred embodiment of the system, the information recording medium 1 consisting of a 4 track magnetic tape driven by a reversible tape drive (2) is shown. Magnetic reading heads 3, 5, 7, and 9 are operatively associated with magnetic recording channels 1, 2, 3 and 4 respectively. The electrical output of one of the four heads is selected by a Field Effect Transistor Switch 19, 21, 23 and 25. The other three Field Effect Transistor Switches block the unselected signals. The selected signal is amplified by an audio amplifier 27 and passes through Field Effect Transistor Switch 29 which normally passes the audio and/or code signal. The audio signal is passed by Field Effect Transistor Switch 31 to audio amplifier 33 which drives an audio output device such as a speaker 35 or earphones. Assuming that a lecture is being reproduced from channel 1 in the forward direction, FET switches 19, 29 and 31 are conducting while FET switches 21, 23 and 25 are blocking. The lecture is reproduced by the speaker 35. Assume that a multiple-choice question having a correct answer E is asked on channel 1 in the forward direction and that this is followed by a code signal which designates track 1 in the forward direction. Assume for the purposes of discussion, as previously discussed, a code signal which orders the selection of the same track and direction as is being used is interpreted as a stop signal.

As described in the referenced copending application, and illustrated in FIG. 3, the code signal typically consists of a 40 Hz keying tone followed by an audible tone code pattern comprised of alternate 2 kHz and 3 kHz tones. The 2 kHz tones serve as spacing between the 3 kHz code tones. The length of the 3 kHz tones determines whether the code bit is a ZERO or a ONE. An extra-long 2 kHz tone can be used to indicate the end of the code message or else the number of bits in the three bit code can be counted to indicate the end of the message. During the reception of each code signal, a keying or cue signal is generated by code detector 37. This keying signal blanks the audio to the speaker 35 by blocking FET switch 31. The keying signal also activates multivibrator 73 which produces an enable pulse which permits AND gates 75, 77 and 79 to conduct and transfer the signals NEW1, NEW2, and NDIR through OR gates 52, 54 and 56 respectively to quad latch 39. This enable signal is also applied to OR gate 66 to clock the QUAD latch, thereby permitting it to accept the signals applied by gates 52, 54 and 56. The code signals pass from FET switch 29 to the code detector 37 which is described in detail in the previously mentioned copending application. The eight codes provided by the three code bits along with their corresponding channel and direction designations are given in FIG. 4.

In the assumed example while traveling in the forward direction in channel 1, the output of QUAD LATCH 39, which may be embodied using a Motorola MC 1813 integrated circuit, contains the track address bit 1, ADD 1, which is a ZERO, the channel address bit, ADD 2, which is a ZERO; and the direction bit, DIR, which is a ONE. If the new track selection bits from the code decoder 37, NEW 1 and NEW 2 are identical to the present address bits ADD 1 and ADD 2 respectively and the new direction bit from the decoder, NDIR, is the same as the present direction bit, DIR, the magnitude comparator 45, which may be embodied using a Texas Instruments SN 7485 integrated circuit, will provide an equality output signal which will reset GO flip-flop 47 which will stop the tape drive at the branch point BP.

Figure 5:
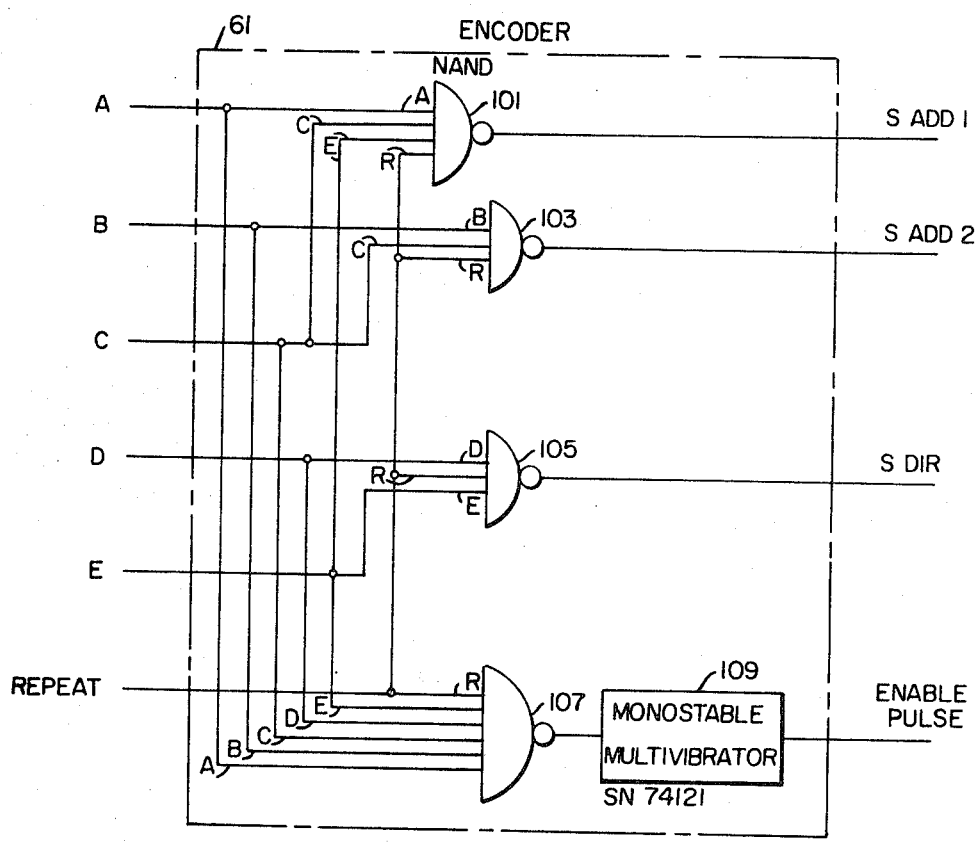
FIG. 5 is a schematic illustration of an encoder of FIG. 1.

The tape will remain at rest until one of the response switches 49, 51, 53, 55, 57, or 59 is depressed. Assuming that switch 57 is depressed corresponding to correct answer E, the encoder 61, shown in detail in FIG. 5, provides switch address bit 1, SADD 1; switch address bit 2, SADD 2; and the switch direction bit, SDIR, having values of ONE, ZERO, and ONE respectively in accordance with the assignment table of FIG. 4. An enable pulse generated by the encoder 61 is passed by gate 63 only if the delayed $\overline{GO}$ signal from RC network 68 is a ONE which indicates that the tape drive is stopped at a branch point. The enable pulse passed by gate 63 activates AND gates 69, 67 and 65 permitting the SADD 1, SADD 2 and SDIR signals to PASS through OR gates 52, 54 and 56 and be stored in QUAD LATCH 39. The output of gate 63 passes through OR circuit 66 to clock the quad latch 39. The output from gate 63 also sets flip-flop 47 to the GO condition which starts the tape drive 2. The tape drive 2, will run in the direction determined by the DIR signal from QUAD latch 39. The $\overline{GO}$ output 60 of flip flop 47 is delayed by an RC network 68 or other suitable means to permit gate 63 to remain open long enough to ensure that the pulse from gate 63 has adequate width to accomplish the desired gating functions. The output of quad latch 39 provides the signals ADD 1 and ADD 2 to decoder 71 which is detailed in FIG. 6. This decoder provides the track selection signal which opens the appropriate FET switch. When starting from the branch point in the example given the response switch E selected, the decoder selects FET switch 21 which passes the desired information from recording channel 2.

Figure 7:
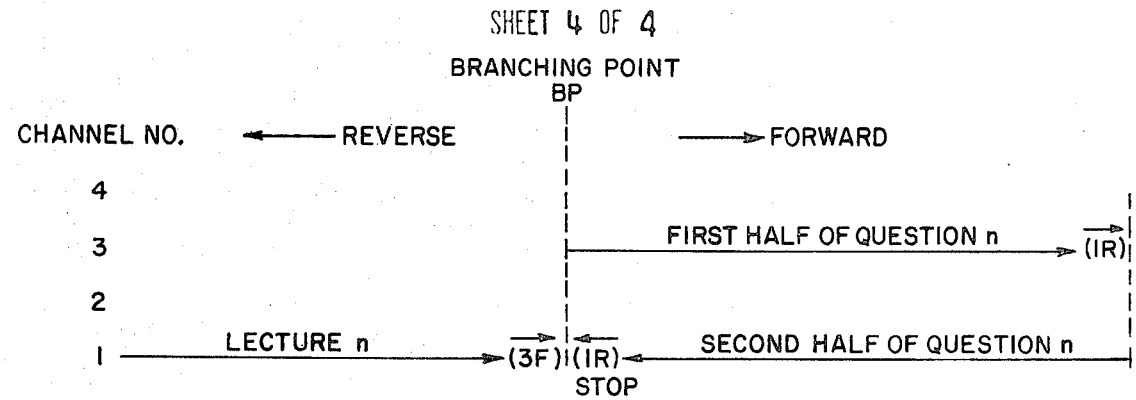
FIG. 7 illustrates technique for repeating a question associated with a recorded lecture.

FIG. 7 illustrates a method for economically providing the capability for repeating the question as many times as desired without experiencing a rewinding delay or requiring the question to be recorded more than one time on the recording medium. Assume that lecture n is being reproduced in the forward direction on track 1. At the end of the lecture a code signal (3F) calls for a shift to track 3 in the forward direction. Since this does not coincide with the present track and direction (1 Forward), an equality signal is not produced by comparator 45 and the tape drive continues past branching point n in the forward direction. As indicated in FIG. 7, the first half of question n is reproduced from channel 3. When the first half of the question has been reproduced code (IR) is read which causes code detector 37 to produce new channel and direction NEW1 = ZERO, NEW2 = ZERO and NDIR = ZERO which are gated through gates 75, 77 and 79 into quad latch 39 which causes the tape drive to run in the reverse direction and reproduce the second half of the question from channel 1. When the second half of the question has been reproduced, code signal (IR) is read and detected by code detector 37, thereby producing outputs NEW1, NEW2 and NDIR equal to ZERO, ZERO and ZERO in accordance with FIG. 4. Since the present running direction and channel are the same as this command, NEW1 is equal to ADD1, NEW2 is equal to ADD2 and NDIR is equal to DIR. These signals are compared by magnitude comparator 45 which produces an equality signal, which resets flip-flop 47 and stops the tape drive at branch point BP. If the REPEAT button 59 is depressed, the encoder 61 will alter the signals in quad latch 39 which will cause the tape drive to start in the forward direction on channel 3, thereby reproducing the first half of question n. The code signal (IR) will be read as before to cause the tape drive to reverse and read the second half of the question from channel 1. At the end of the question the code (IR) will be read again which will stop the drive at branch point BP. Thus, the question may be repeated as many times as desired. This method economizes the use of tape, since question n appears on the tape only once.

Figure 8:
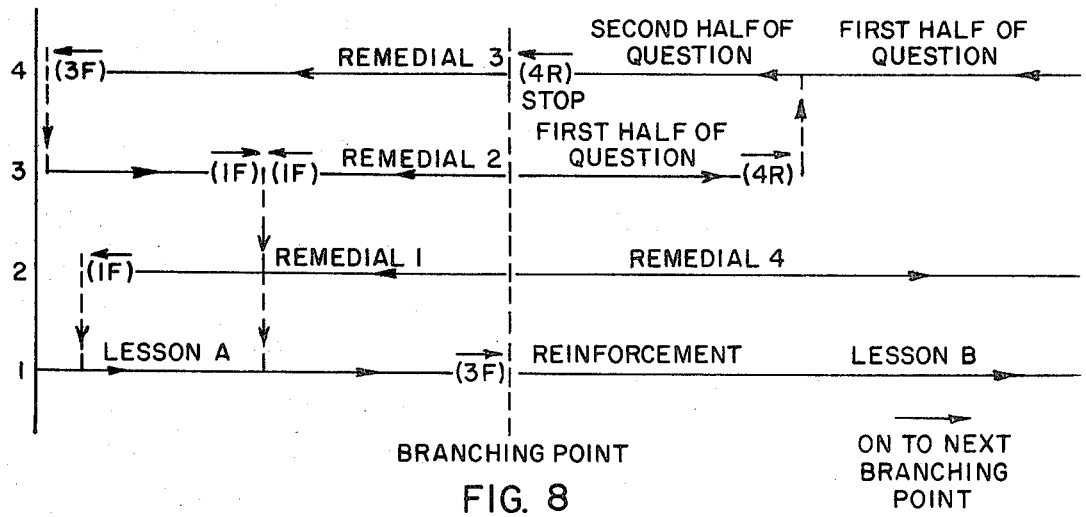
FIG. 8 illustrates a typical lesson plan recorded about a branching point on the recording medium.

A typical lesson plan for a multiple-choice question is illustrated in FIG. 8. Assume that lesson A is being reproduced from Channel 1 in the forward direction. When the code (3F) is read, the first half of the question is reproduced from channel 3. The code (4R) causes the drive to reverse sand the second half of the question is read from channel 4. The second successive (4R) code causes the tape drive to stop at the branch point and await a student response. If the student selects the correct answer by depressing switch D, the tape drive will be started in the forward direction and the reinforcing information, which may be a repeat of the correct answer and congratulations for answering correctly, will be followed by the next lesson B. If the student selects incorrect answer A, the tape drive will start in the reverse direction on channel 2 and reproduce remedial material 1. The code (1F) at the end of the remedial material will cause the tape drive to reverse and reproduce a portion of lesson A followed by the question. If the student selects incorrect answer C, remedial lesson 2 will be reproduced followed by an even shorter portion of lesson A. Incorrect answer B will result in the reproduction of remedial material 3 which, unlike some prior art devices, can be of greater length than lesson A. This is made possible by the flexibility which permits a single remedial to occupy a number of channels. If incorrect answer E is selected, the drive is started in the forward direction to reproduce remedial 4 from channel 2. The code (4R) causes the drive to reverse and continue reproducing this remedial information from channel 4. In this case the first half of the question is also recorded on channel 4 to permit full use of the reproducing channels.

Figure 9:
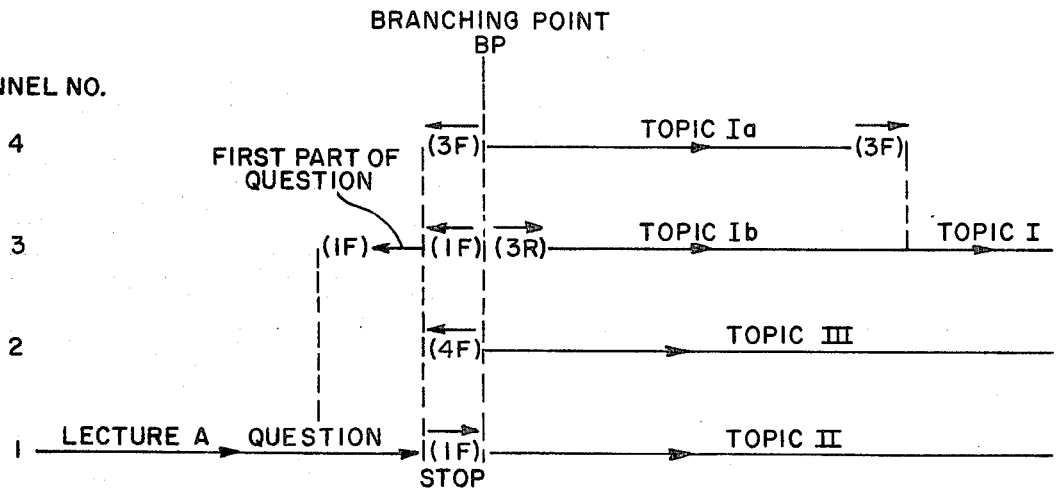
FIG. 9 illustrates an additional lesson plan format.

A different type of branching is illustrated in FIG. 9. This type is useful for presenting selected instructional material or for a questionnaire presentation. Assume that lecture A is being presented on channel 1 in the forward direction. Following the question, code (1F) is read which stops the tape drive at the branching point BP. Assume the question asks whether the student is more interested in topics Ia, Ib, II or III. Assume that the question is not fully remembered and the REPEAT switch is depressed. The encoder 61 sets quad latch 39 so as to start the drive in the forward direction and read the code (3R) on channel 3. This causes the drive to reverse. However, if nothing was done to prevent it, the code (3R) would be read in the reverse direction followed by the reading of the (1F) code. The code and audio signals are blanked by FET switch 29 of FIG. 2 to prevent reading these undesired codes when reversing immediately following a manual switch entry at a branching point. When a switch is depressed with the drive stopped at a branching point, the enable pulse passes through gate 63 and triggers monostable 85 which produces a two second pulse to indicate that the drive has just started from a branching point. When a code which commands changing the direction of the tape drive is read during this period, the code detector signal NDIR and the DIR output of quad latch 39 are unequal. These signals are supplied to magnitude comparator 81 which provides a signal to cause gate 83 to conduct when they are unequal. This permits the output from monostable 85 to pass through gate 83 to trigger monostable 87 which provides a 2 second pulse to blank the signal at FET switch 29. Therefore, the codes (3R) read in reverse and (1F) are ignored since they are traversed before the pulse from monostable 87 ends.

Following the end of this pulse, the first part of the question is reproduced from channel 3 with the tape running in the reverse direction. The code (1F) is then read which causes the drive to change to the forward direction. Since the pulse from monostable 85 has ended prior to this time, monostable 87 is not triggered and no blanking occurs. The remaining part of the question is reproduced from channel 1 and the code (1F) is read which stops the drive at the branching point. If switch A is depressed, the drive is started in the reverse direction and the code (4F) is read from channel 2. This is a reversal command following starting from a branch point which causes monostable 87 to produce a blanking pulse which prevents reading the code (3F) on channel 4. Following the blanking pulse, Topic Ia is presented on channel 4. If switch B is depressed when stopped at the branching point, the drive is started in the reverse direction and the (3F) code is read from channel 4. The blanking pulse from monostable 87 prevents reading the (1F) and (3R) codes from channel 3. Following the blanking pulse, Topic Ib is reproduced from channel 3. If switch C is depressed when stopped at the branching point, the drive will be started in the reverse direction and code (1F) will be read from channel 3. Since this calls for a reversal, monostable 87 will produce a pulse to prevent the reading of the (1F) code on channel 1. Following the end of this pulse, topic II will be reproduced from channel 1. The selection of switch D, when stopped at the branching point, will start the drive in the forward direction and topic II will be reproduced from channel 1. The selection of switch E will start the drive in the forward direction and Topic III will be reproduced from channel 2. The example of FIG. 9 illustrates the technique for blanking immediately after starting from a branch point. This technique permits the selection of any of the five choices as the correct answer to a multiple-choice question. Even though the correct answer button starts the drive in the reverse direction, a forward code can be read and unwanted codes skipped over to get to the next lecture in the forward direction. The topics given in FIG. 9 could be selected questions in a questionnaire. For example, the question following lecture A (or instruction A) could ask a question concerning the age and sex categories of a patient for whom a medical history is being taken. Depending on these categories, a different set of subsequent questions could be asked. These questions would replace topics Ia, Ib, II and III of FIG. 9.

The encoder 61 can be embodied using 7400 series TTL NAND gates 101, 103, 105 and 107 connected as shown in FIG. 5. The monostable multivibrator 109, which may be embodied using a SN74121 integrated circuit, is connected with an external timing capacitor to provide an output pulse of approximately 10 microseconds duration when a ONE signal is applied from NAND 107. This output pulse is the enable pulse output of encoder 61.

Figure 6:
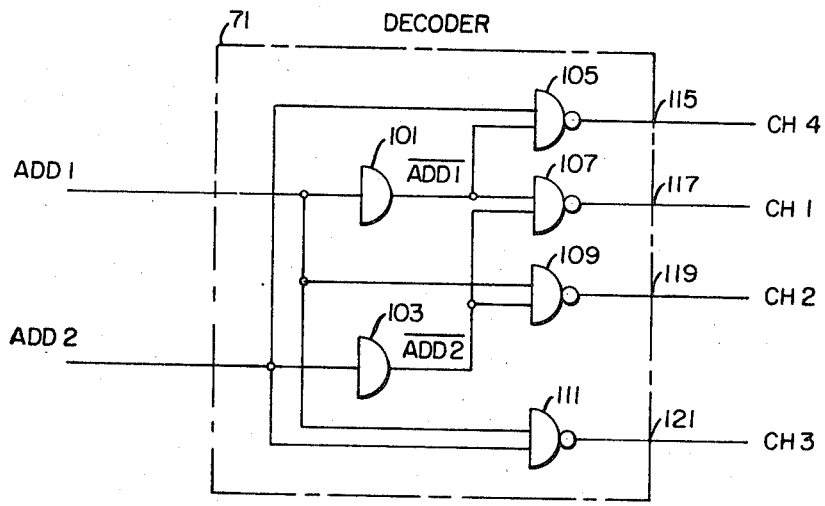
FIG. 6 is a schematic illustration of a decoder of FIG. 1.

The decoder 71 which is detailed in FIG. 6 has as its input the ADD1 and ADD2 signals from quad latch 39. NAND gates 101 and 103 form the complement signals $\overline{ADD1}$ and $\overline{ADD2}$. NAND gate 105 operates on $\overline{ADD1}$ and ADD2 to provide a ZERO output on lead 115 when channel 4 is selected. Lead 115 connects to the P channel junction field effect transistor switch 25 which passes signal 17 when lead 115 is a ZERO and blocks signal 17 when lead 115 is a ONE. Similarly, NAND 107 provides a ZERO output to FET switch 19 when channel 1 is selected. NAND 109 provides a ZERO output signal to FET switch 21 when channel 2 is selected. NAND 111 provides a ZERO output signal to FET switch 23 when channel 3 is selected. Whenever one of the output leads of decoder 71 is in a ZERO state, the other three output leads are in a ONE state. Thus, only one of the FET switches passes a signal at any given time.

Although specific channel assignments were illustrated in the described embodiment, it is obvious to those skilled in the art that other channel assignments could be used. For example, in the application illustrated in FIG. 9, the coding would be simplified if the REPEAT function resulted in the selection of a channel in the reverse direction.

Multichannel film projectors such as manufactured by Zeiss/Panacolor could be controlled using the teachings of this invention. This film projector can have up to 12 visual-audio channel pairs, the selection of which could be controlled by the channel selection signal from decoder 71. This projector is reversible and the direction could be controlled by the direction signal DIR. The control codes and audio could be recorded on the audio channel. The result would be a flexible audio-visual instructional device.

We claim as our invention:

1. An instructional system comprising a multichannel record/reproduction medium having forward and reverse drive capabilities and having recorded thereon lecture information followed by a recorded request for a listener response, and segments of supplemental material in the form of remedial information, reinforcing information, secondary lectures, etc. being recorded on a plurality of channels of said multi-channel medium, a request for listener response associated with a lecture concluding at a branching point in said multi-channel medium, recorded code signals associated with said segments of supplemental material designating the track location and direction of the appropriate successive material, and a plurality of listener operated means, each of said listener operated means comprising a code designating a different one of said plurality of channels containing supplemental material and a direction of travel of said medium, each and every operation of any of said plurality of listener operated means causing reproduction of information on said designated channel in said designated direction, the reproduced information immediately adjacent to said branching point on said designated channel further determining whether information on said designated channel or yet another channel is to be reproduced, said reproduced information immediately adjacent to said branching point being either in the form of supplemental material in which case the supplemental material is reproduced as it appears on said designated track or in the form of a code signal causing reproduction of information on yet another channel in a specified direction about said branching point.

2. An instructional system as claimed in claim 1 wherein said request for listener response associated with said lecture continues from said branching point in the same direction as said lecture for approximately one half of the request for listener response, the second half of said request for listener response being recorded on another channel in the opposite direction such that said request for listener response terminates at said branching point.

3. An instructional system as claimed in claim 1 further including a repeat recording of said request for listener response, said repeat recording appearing on more than one channel and in more than one direction so as to begin and end at said branching point.

4. An instructional system as claimed in claim 1 wherein the material reproduced in response to said listener response includes a predetermined amount of said original lecture and said original request for listener response.

5. An instructional system as claimed in claim 1 wherein some segments of said supplemental material are reproduced in response to the actuation of one or more of said plurality of listener operated means.

6. An instructional system as claimed in claim 1 wherein said code signals comprise an audible tone code pattern representative of a digital address identifying a particular channel and direction of reproduction, further including means for blanking the reverse reproduction of said audible tone code pattern when reproduction of said audible tone code pattern calls for a reversal in the direction of travel of said multichannel medium on the same channel, said blanking being for a time duration sufficient to prevent reproduction of said audible tone code pattern in reverse.

7. An instructional system as claimed in claim 1 wherein the presence of a recorded code signal on a channel following reproduction of information on said channel in a given direction corresponds to a command for continuous reproduction of information on said channel in said given direction results in termination of the reproduction of information.

* * * * *